United States Patent Office 2,734,912
Patented Feb. 14, 1956

2,734,912

CARBONYLATION OF AROMATIC HALIDES

Henry J. Leibu, Wilmington, Del., assignor to E. I. du Pont de Nemours and Company, Wilmington, Del., a corporation of Delaware No Drawing. Application September 7, 1951,
Serial No. 245,645

5 Claims. (Cl. 260—475)

This invention relates to an improved process for carbonylation of aryl halides, such as monochlorobenzene, dichlorobenzenes and related compounds. The specific improvement to which the present invention is directed relates to the use of specific solid catalysts, which have a beneficial effect upon the carbonylation reaction.

The term "carbonylation," as employed herein, means the introduction of C=O into an organic molecule.

It has been known heretofore that the carbonylation of aryl halides takes place to a certain extent in the presence of specific catalysts such as nickel chloride, nickel nitrate, nickel formate, mixed nickel oxalate-copper oxalate, etc., especially in the presence of water, which causes the hydrolysis of the aryl halides initially formed with the resultant production of aromatic carboxyl acids (Dieterle and Eschenbach, German Patent 537,610 and Arch. Pharm. 265 187–93 (1927)). More recently it has been discovered (Bliss and Southworth, U. S. Patent 2,565,461, and Prichard and Tabet, U. S. Patent 2,565,462) that the carbonylation of aryl halides takes place quite efficiently in the presence of carbonyls of metals of the iron sub-group, especially if an organic reactant is present which is capable of converting the aroyl halide, which is initially formed, to an ester of the corresponding aromatic acid. The said organic reactants include alcohols, alkoxyalkanes, and phenols.

In accordance with the prior art processes hereinabove described, mono-alkyl and di-alkyl terephthalates could be obtained by carbonylation of dichlorobenzene in the presence of alkoxy donors.

An object of the present invention is to provide an improved catalytic process whereby the carbonylation of aryl halides can be effected in excellent yield and at greatly improved reaction rates. Another object is to provide a process for carbonylation of aryl halides in the presence of novel catalysts which do not unduly interfere with the separation of the reaction products from the crude reaction mixtures. Other objects of the invention will appear hereinafter.

The present invention provides a novel method for carbonylation of aryl halides by the use of specific solid catalysts containing metallic nickel in combination with certain other metallic substances, especially metals of the class consisting of copper and chromium. The invention is preferably carried out in the presence of an alkoxy donor, examples of which include hydroxyalkanes, alkoxyalkanes, alkoxyhydroxyalkanes, cycloalkanols, cycloalkenols, alkenols, alkynols, and phenols. Mixtures of the said alkoxy donors, especially mixtures of alkanols and alkoxyalkanes, are effective.

The present invention is not limited to processes employing two-component catalysts, it being understood that other metallic ingredients may be present in the catalyst in addition to metallic nickel and the member of the class consisting of copper and chromium. In fact, one of the most active catalysts employed in the practice of the invention is a three-component catalyst containing nickel, copper, and zinc. Another preferred catalyst is a two-component catalyst containing nickel and chromium. While in general these metallic catalysts are employed in the form of the fully reduced metals, excellent results are also obtained when the degree of reduction is such that a combination of metal and metal oxide is present.

The aryl halide reactants, in general, contain chlorine, bromine or iodine attached directly to the aromatic nucleus. Such compounds include monochlorobenzene, o-dichlorobenzene, p-dichlorobenzene, chloronaphthalenes, chloroanthracenes, and the corresponding bromo and iodo compounds. It is to be understood that the polyhaloaromatic compounds may undergo a reduction reaction to some extent during the course of the carbonylation reaction. For example, when the haloaromatic compound is a trichlorobenzene, the carbonylation product will include not only those esters containing three carbalkoxy groups but also esters containing two carbalkoxy groups, and even a certain amount of ester containing only one carbalkoxy group.

Any organic compound capable of converting a

halogen group to an ester group may be employed in the practice of the invention. Preferred organic reactants for this purpose are the alkoxy donors such as the lower alcohols and the lower dialkyl ethers. Suitable examples of such compounds are methanol, isopropanol, tertiary butanol, polyvinyl alcohol, ethylene glycol, allyl alcohol, cyclopentanol, dimethyl ether, diethyl ether, ethoxyethanol, phenol, toluol, beta-naphthol, etc.

The carbonylation of an aryl halide in the presence of an alkoxy donor may be illustrated by means of the following equation:

wherein R is an alkyl group (preferably an alkyl group having from 1 to 4 carbon atoms) and R' is a member of the class consisting of hydrogen and alkyl groups (preferably alkyl groups containing from 1 to 4 carbon atoms). When the dichlorobenzene which is employed in accordance with the foregoing equation is paradichlorobenzene, the carbonylation product is an ester of terephthalic acid.

In general, small amounts of nickel carbonyl may be produced during the course of the carbonylation reaction and since the process is generally carried out in a continuous manner, any nickel carbonyl thus formed is rather rapidly removed from the reaction zone by the flowing reaction mixture. It is not at all necessary to employ a sufficient quantity of catalyst to produce a substantial amount of nickel carbonyl and, in fact, the quantity of nickel carbonyl present in the reaction mixture is generally either zero, or virtually zero, and rarely, if ever, greater than 0.007 mols per mol of aryl halide undergoing reaction. The space velocity based on the total mols of the reaction mixture (N. T. P.) is generally within the range of 20 to 60.

The carbonylation of aryl halides in accordance with this invention takes place at temperatures as low as about 200° C., although optimum results are obtained by carrying out the reaction at temperatures within the range of about 250° C. to 450° C. Best results are achieved at pressures above atmospheric, preferably within the range of about 200 to 1500 atmospheres.

Any suitable reaction vessel, preferably adapted to use under continuous flow conditions, may be employed in the practice of the invention. Reaction vessels made of or lined with inert metals such as stainless steel, platinum, etc. are most frequently employed. The catalyst is generally present in the reaction vessel in the form of a fixed bed, although it is possible to carry out the process of the invention by the use of the so-called fluidized solid catalyst technique. If desired, the reactants may be injected at one or more points along the tubular reaction vessel, but this is generally not necessary or even advantageous.

Any suitable method may be employed for separating the carbonylation products from the reaction mixture obtained in the practice of the invention. Since the reaction products are usually esters, and since these products are not as badly contaminated with nickel carbonyl or other interfering substances as in prior art processes, one of the important advantages of the invention is the ease of separating the carbonylation products from the other ingredients of the reaction mixture. The esters can be obtained in sufficiently pure form to be employed as polymer intermediates, plasticizers, etc. by direct distillation of the crude reaction mixtures.

The quantity of carbon monoxide injected with the aryl halide may be varied over a rather wide range, but it is generally preferred to employ at least the stoichiometrically required quantity, a slight excess being advantageously present in the reaction zone. From the standpoint of economy, it is not preferred to employ a large excess of the carbon monoxide. Hydrogen may be present in the reaction mixture, and in some instances it exerts a somewhat beneficial effect. However, the reaction takes place very readily in the absence of added hydrogen. Hydrogen is employed, however, in producing reduced catalysts from reducible oxides, etc. Such reduction may be carried out at a temperature of about 300° C.

The invention is illustrated further by means of the following examples:

*Example 1.*—In a series of experiments, dichlorobenzene was heated in the presence of various nickel-containing catalysts at 350° C. with carbon monoxide under a pressure of 500 atmospheres. In each instance, the reaction time was three hours. The catalyst contained one gram of nickel per 20 grams of p-dichlorobenzene, 35 grams of dimethyl ether and 140 grams of benzene (which was used as a diluent). The products were separated from the catalyst by filtering and by distillation of the reaction mixture. The results obtained were as follows:

TABLE

*Fixed bed catalysts for carbonylation of p-dichlorobenzene to dimethylterephthalate*

| Catalyst | Percent Conversions | | | Percent Yields* | |
|---|---|---|---|---|---|
| | of p-Di-chloro-benzene | to Methyl p-chloro-benzoate | to Di-methyl-tereph-thalate | Methyl p-Chloro-benzoate | Dimethyl-tereph-thalate |
| Cu-Ni | 92.5 | 16 | 53 | 17.6 | 57.5 |
| Cu-Ni-Zn | 96.5 | 10.8 | 76.5 | 11.2 | 79.5 |
| Cu-Ni-ZnO | | | 65 | | |
| NiO-CrO | 94 | 16 | 50 | 16 | 50.6 |
| NiO-MgO | 59 | 18.6 | 24 | 31.4 | 40.5 |
| NiO-MgO** | 72.5 | 27.3 | 30.4 | 35 | 38.3 |
| No catalyst | 14.8 | 10.1 | 4.8 | 68 | 32 |
| No catalyst (Pt lined tube) | | 10.8 | 4.5 | | |

* Including minor amounts of the corresponding acids.
**Catalyst was reheated for 3 hours at 350° C./500 atm. CO pressure and used afterwards with still increased activity.

*Example 2.*—To a stainless steel shaker tube of about 300 cc. capacity was added 40 grams of monobromobenzene, 36 grams of methanol, 50 grams of dimethyl ether and 7 grams of a reduced nickel-copper catalyst. The tube was sealed and heated with shaking at 326°–330° C. for thirty minutes at 400–405 atm. carbon monoxide pressure. After cooling and discharging, the products were separated from the catalyst by filtration. The distillation was carried out first under atmospheric and then under diminished pressure (100 m./m. Hg). There was obtained 2.1 grams of monobromobenzene, 20 grams methyl benzoate (boiling at 129–131° C./100 mm. Hg), 3.5 grams of benzoic acid and traces of biphenyl. The catalyst used contained 85% copper and 15% nickel by weight and was prepared from fused oxides by reduction with hydrogen.

It is to be understood that the foregoing examples are illustrative only and that they are not intended to limit the scope of the invention. Similar results are obtained, for example, using an iodobenzene as the haloaromatic reactant. Numerous methods for modifying the illustrated procedure will be apparent to those who are skilled in the art. For example, any unreacted aryl halide may be continuously recovered from the distillation step and recycled to the reaction zone. It is our intention that all such changes and modifications to the extent that they are within the scope of the appended claims shall be considered as part of our invention.

I claim:

1. The method for carbonylation of an aryl halide having at least one halogen of the class consisting of chlorine and bromine attached directly to a benzene nucleus, said halogen being the sole substituent attached to the said benzene nucleus, which comprises carrying out the said carbonylation reaction at a temperature within the range of 200° C. to 450° C. under a pressure within the range of 200 to 1500 atmospheres in the presence of a solid catalyst consisting essentially of metallic nickel and a member of the class consisting of metallic copper and metallic chromium, and also in the presence of an alkoxy donor of the formula ROR' wherein R is an alkyl group having from 1 to 4 carbon atoms and R' is a member of the class consisting of hydrogen and alkyl groups having from 1 to 4 carbon atoms, and separating from the resulting mixture the ester produced by the carbonylation reaction.

2. The method of claim 1 in which the aryl halide reactant is para-dichlorobenzene.

3. In a process for preparing a methyl ester of terephthalic acid, the step which comprises conducting dichlorobenzene, carbon monoxide and methanol over a solid catalyst consisting essentially of metallic nickel and a member of the class consisting of metallic copper and metallic chromium at a temperature within the range of 200° C. to 450° C. under a pressure within the range of 200 to 1500 atmospheres whereby a methyl ester of terephthalic acid is produced and thereafter separating said ester from the reaction mixture.

4. The process of claim 3, wherein the said catalyst is a nickel-copper-zinc oxide catalyst.

5. The process of claim 3, wherein the said catalyst comprises metallic nickel and metallic chromium.

References Cited in the file of this patent

UNITED STATES PATENTS

| 2,565,462 | Prichard et al. | Aug. 28, 1951 |
| 2,565,464 | Tabet | Aug. 28, 1951 |

FOREIGN PATENTS

| 621,520 | Great Britain | Apr. 11, 1949 |